(12) United States Patent
Yun

(10) Patent No.: US 11,939,706 B2
(45) Date of Patent: Mar. 26, 2024

(54) LIGHT SHIELDING NET

(71) Applicant: Hyo Sang Yun, Gongju-si (KR)

(72) Inventor: Hyo Sang Yun, Gongju-si (KR)

(73) Assignee: Seung Chan HWANG, Gongju-si (KR)

( * ) Notice: Subject to any disclaimer, the term of this patent is extended or adjusted under 35 U.S.C. 154(b) by 150 days.

(21) Appl. No.: 17/771,593

(22) PCT Filed: Jul. 14, 2020

(86) PCT No.: PCT/KR2020/009230
§ 371 (c)(1),
(2) Date: Apr. 25, 2022

(87) PCT Pub. No.: WO2021/080125
PCT Pub. Date: Apr. 29, 2021

(65) Prior Publication Data
US 2022/0372677 A1 Nov. 24, 2022

(30) Foreign Application Priority Data
Oct. 23, 2019 (KR) ........................ 10-2019-0132429

(51) Int. Cl.
*D03D 15/00* (2021.01)
*D03D 1/00* (2006.01)
*D03D 9/00* (2006.01)
*D03D 15/283* (2021.01)
*D03D 15/46* (2021.01)
(Continued)

(52) U.S. Cl.
CPC ........... *D03D 15/283* (2021.01); *D03D 1/007* (2013.01); *D03D 9/00* (2013.01); *D03D 15/46* (2021.01); *D03D 15/54* (2021.01); *D03D 15/547* (2021.01); *D03D 15/573* (2021.01); *D03D 19/00* (2013.01); *A01G 13/0206* (2013.01)

(58) Field of Classification Search
CPC ........ D03D 15/283; D03D 1/007; D03D 9/00; D03D 15/46; D03D 15/54; D03D 15/547; D03D 15/573; D03D 19/00; D03D 13/006; D03D 15/00; A01G 13/0206; A01G 9/22; D10B 2321/021; D10B 2401/22; Y02A 40/25
See application file for complete search history.

(56) References Cited

U.S. PATENT DOCUMENTS 5,591,153 A * 1/1997 Mattingly, III ..... A61F 13/5611
  604/386
5,769,837 A * 6/1998 Parr .................... A61F 13/5611
  604/386

(Continued)

FOREIGN PATENT DOCUMENTS

KR 20-1994-0000382 1/1994
KR 20-1997-0023550 U 6/1997
(Continued)

*Primary Examiner* — Robert H Muromoto, Jr.
(74) *Attorney, Agent, or Firm* — Maschoff Brennan

(57) ABSTRACT

A light shielding net, which can improve productivity by facilitating a weaving process, can be wound by a winding device due to a high winding strength, and can express various colors, thereby adjusting a light shielding amount and improving a design aesthetic sense. To this end, a warp yarn is made of a PE monofilament, the weft yarn is made of a PE film, and the two warp yarns are repeatedly woven in a Leno weave form surrounding each weft yarn.

8 Claims, 3 Drawing Sheets

(51) Int. Cl.
  *D03D 15/54*   (2021.01)
  *D03D 15/547*  (2021.01)
  *D03D 15/573*  (2021.01)
  *D03D 19/00*   (2006.01)
  *A01G 13/02*       (2006.01)

(56) References Cited

U.S. PATENT DOCUMENTS

| | | | |
|---|---|---|---|
| 7,992,596 B2* | 8/2011 | Khokar | D03D 49/60 |
| | | | 139/420 R |
| 8,129,294 B2* | 3/2012 | Khokar | D03D 41/00 |
| | | | 442/187 |
| 10,750,680 B2* | 8/2020 | Toye | D03D 5/00 |
| 10,849,281 B2* | 12/2020 | Toye | A01G 13/0206 |
| 2008/0257443 A1* | 10/2008 | Khokar | D03D 1/0094 |
| | | | 139/443 |
| 2009/0007981 A1* | 1/2009 | Khokar | D03D 47/18 |
| | | | 139/383 A |
| 2011/0041677 A1* | 2/2011 | De Weijer | B32B 5/26 |
| | | | 156/243 |
| 2013/0022295 A1* | 1/2013 | Shapiro | B31B 70/645 |
| | | | 383/61.3 |
| 2017/0095992 A1* | 4/2017 | Arthurs | D03D 9/00 |
| 2017/0135291 A1* | 5/2017 | Toye | A01G 13/0206 |
| 2018/0206419 A1* | 7/2018 | Toye | D03D 5/00 |

FOREIGN PATENT DOCUMENTS

| | | |
|---|---|---|
| KR | 10-2002-0025298 A | 4/2002 |
| KR | 2013-0044490 A | 5/2013 |
| KR | 10-2016-0051028 A | 6/2016 |
| KR | 10-2016-0051029 A | 6/2016 |
| KR | 10-1868279 | 6/2018 |
| KR | 10-2071226 B1 | 1/2020 |

* cited by examiner

[FIG. 1]
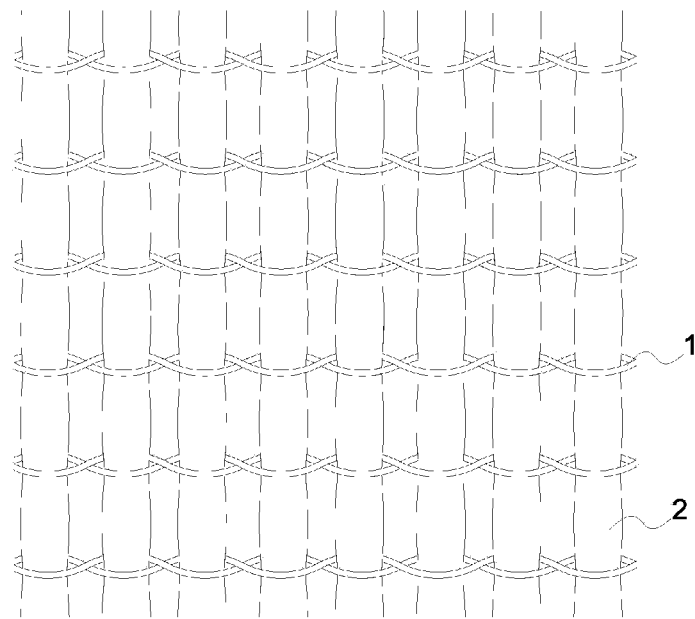
[FIG. 2]
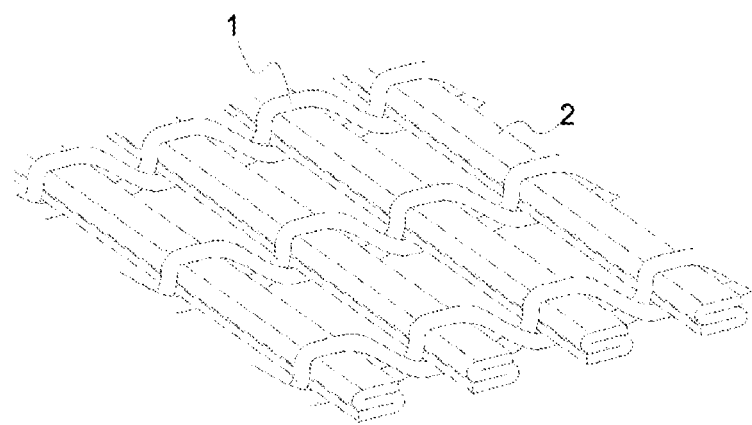

[FIG. 3]
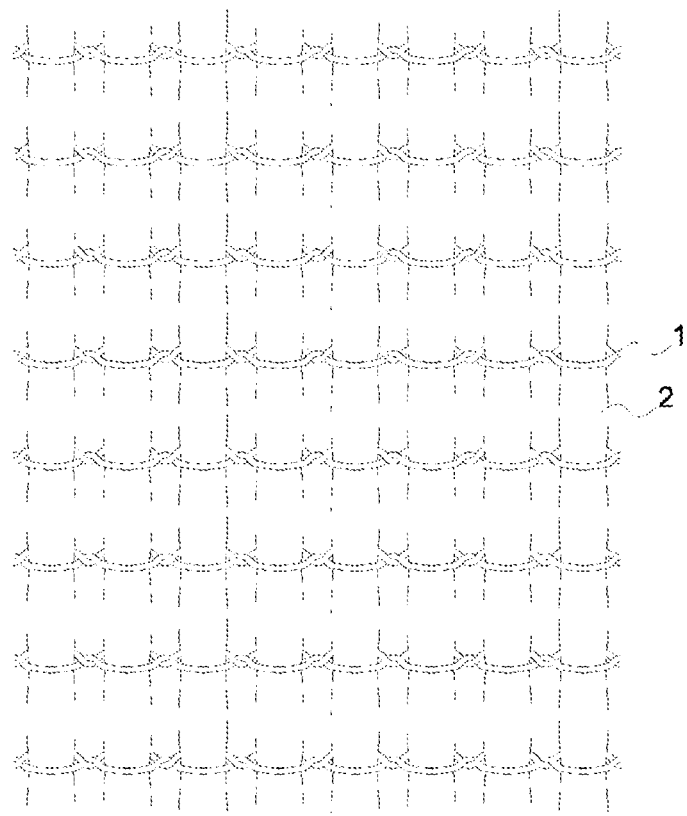

[FIG. 4]
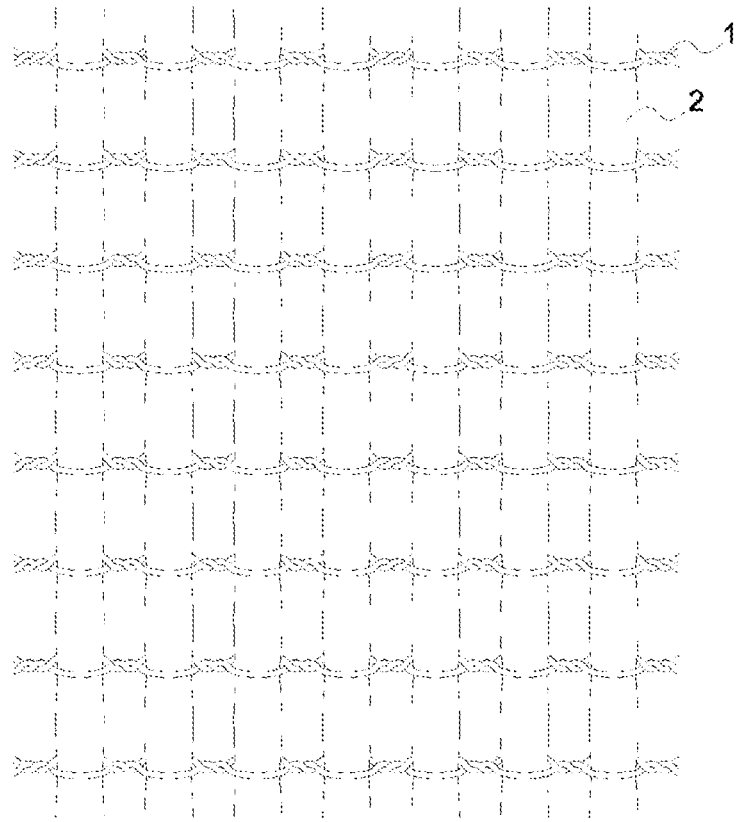
[FIG. 5]
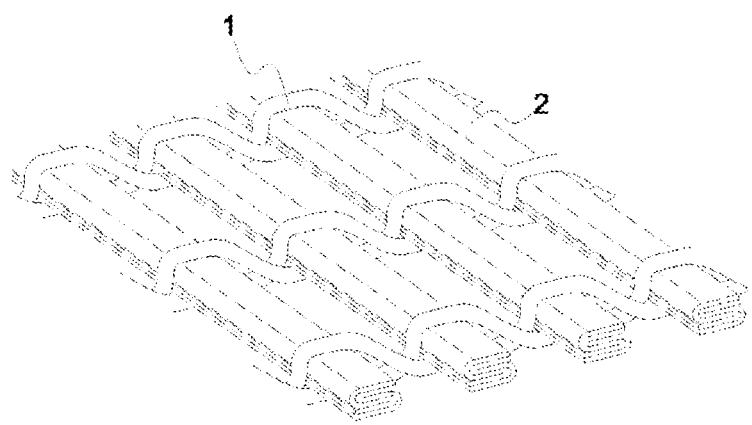

LIGHT SHIELDING NET

TECHNICAL FIELD

The present invention relates to a shading net and, more particularly, to a light shielding net which is easy to weave to improve productivity, has a high winding strength to enable winding up by a winding device, and can express various colors, thereby adjusting a light shielding amount and enhancing aesthetic sense of design.

BACKGROUND ART

In general, the shading net has a function of blocking sunlight but a load on the installation facility must be minimized.

Accordingly, the shading net is woven with monofilaments or the like using a film-type yarn.

With regard to such a shading net, Korean Utility Model Laid-Open Publication No. 85-6916 (a light shading net, laid-open on Oct. 4, 1985) proposed a technique for cross-weaving a number of film yarns (1), (1a), (1b), (1c) . . . by forming knots of mono yarns (2), (2a), (2b), (2c) . . . , wherein a film yarn 1 is hooked and tied between a mono yarn 2 and the next mono yarn 2c to make two film yarns 1 and 1a to be adjacent to each other, and these film yarns are crossed and woven by four mono yarns (2), (2a), (2b) and (2c) while overlapping each other half by half, followed by heat-pressing the resulting woven fabric.

Further, Korean Patent Laid-Open Publication No. 10-2002-0025298 (a light shading net for agricultural materials, laid-open on Apr. 4, 2002) proposed a shading net 4 to block sunlight prepared by knitting a number of film yarns (2, 2a, 2b, 2c) and mono yarns (1, 1a, 1b, 1c), wherein: a loop 3 is formed by combining one end of the film yarn 2 with the mono yarn 1 and sending the same to the rear of the previously formed loop 3a; the mono yarn 1 and the film yarn are separated; another loop 3b is formed after the previously formed loop 3 by combining the mono yarn 1 with the supplied other film yarn 2a; the film yarn 2a moves to the next course, and is combined with another mono yarn 1a to form another loop 3'; the film yarn 2 moved to the course moves again to a position where the loop 3 was firstly formed and then is combined with the mono yarn 1 to form the loop 3; and the above processes are repeated for knitting.

Further, Korean Patent Registration No. 10-1868279 (a method for manufacturing a shading net with improved shading efficiency, registered on Jun. 8, 2018) disclosed a method for manufacturing a shading net through a warp knitting machine that has a reference yarn supply path consisting of a first path to a ninth path and a reverse thread supply path oriented from the first path to the ninth path as one path unit, and specifically proposed a technique which is completed by comprising: a first step of forming a first reference yarn in a direction from the first path to a third path during a first time, forming a second reference yarn in a direction from the third path to a fifth path, forming a third reference yarn in a direction from the fifth path to a seventh path, and forming a fourth reference yarn in a direction from the seventh path to the ninth path; a second step of sequentially binding the reverse thread to the reference yarn in the first path and the reference yarn in the third path during the first time in correspondence with the first reference yarn; a third step of expanding the first to fourth reference yarns in a direction of the reference yarn supply path along the third path while a predetermined time elapses after the first time; a fourth step of returning the first to fourth reference yarns to their initial paths during a second time after the lapse of the predetermined time; a fifth step of sequentially binding the reverse thread to the reference yarn in the ninth path and the reference yarn in the seventh path in correspondence with the fourth reference yarn during the second time; and a sixth step of sequentially repeating the above first to fifth steps.

However, most of the conventional shading nets as described above are manufactured by combining or complexly weaving film-type weft yarns using monofilaments, and the weaving method is complicated to cause a decrease in productivity and a low strength, hence leading to frequent occurrence of damages by external impact.

As a result, the shading net has a short lifespan and, when applied to a facility such as a green house, it is difficult to apply a winding process for removing and installing the shading net depending on external environments.

DISCLOSURE

Technical Problem

In order to overcome the above problems, it is an object of the present invention to provide a light shielding net with improved productivity because it is easy to weave.

Another object of the present invention is to provide a light shielding net with increased winding strength so that it can be more easily operated by a winding device or the like when installing a large-scale light shielding net in a facility and removing the same.

A still further object of the present invention is to provide a light shielding net capable of selectively controlling a light shielding amount and expressing various colors to thus enhance design aesthetic sense.

Technical Solution

With regard to the light shielding net to accomplish the objects of the present invention, a warp yarn is made of a PE monofilament while a weft yarn is made of a PE film, wherein these yarns are repeatedly woven in a Leno weave form such that two warp yarns surround each weft yarn, thereby completing the light shielding net with increased winding strength.

Further, the two warp yarns may be woven to be crossed while surrounding the weft yarn, or each warp yarn may be twisted once or twice after crossing, wherein a width of the PE film used for the weft yarn ranges from 2 to 5 mm, and the PE monofilament used for the warp yarn is a PE material mixed with a UV blocking agent.

Further, for optimal weaving, a weaving density of the weft yarn may range from 7 to 15/in, a weaving density of the warp yarn may range from 2 to 5/in, and the weft yarn may be prepared using one or two PE films. At this time, in order to regulate the winding strength and the light shielding amount, a single sheet of PE film may be folded in two or three layers in a width direction or two PE films are stacked and folded in four or six layers in the width direction while weaving the same.

Further, in order to improve an aesthetic sense of the design and to control the light shielding amount, there is provided a light shielding net characterized in that a PE film containing a pigment to express color is used as the weft yarn, thereby better achieving the object of the present invention.

Advantageous Effects

According to the present invention, the light shielding net may be effectively provided with advantages in that: it can be easily woven to thus improve productivity; a winding strength is increased so that, when installing a large scale light shielding net in a facility or removing the same, it can be more easily operated using a winding device; a light shielding amount can be selectively controlled; and various colors can be expressed thus enhance an aesthetic sense of design.

DESCRIPTION OF DRAWINGS

FIG. is a structural diagram showing a woven structure according to the present invention.

FIG. 2 is a side perspective view showing the woven structure according to the present invention.

FIGS. 3 and 4 are structural diagrams showing another embodiment according to the present invention.

FIG. 5 is a side perspective view showing another embodiment accord n to the present invention.

DETAILED DESCRIPTION OF PREFERRED EMBODIMENTS OF INVENTION

Hereinafter, in order that those skilled in the art, to which the present invention pertains, can easily implement the invention, the present invention will be described in detail with reference to the accompanying drawings.

FIG. 1 is a structural diagram showing a woven structure according to the present invention, while FIG. 2 is a side perspective view showing the woven structure according to the present invention.

Hereinafter, referring to FIGS. 1 and 2, the light shielding net of the present invention will be described in detail as follows: two warp yarns made of polyethylene (PE) monofilaments and a weft yarn made of a PE film may be woven in a Leno weave form so as to provide a light shielding net.

Specifically, two warp yarns consisting of PE monofilaments may be repeatedly woven in a Leno weave form, in which the two warp yarns surround each weft yarn, so as to produce a light shielding net fabric, followed by using the woven and completed fabric to provide the light shielding net of the present invention.

In this case, weaving the light shielding net in the Leno weave form may not only improve productivity but also increase a winding strength so as to prevent damages to the light shielding net during work such as removal and installation of the light shielding net to control a temperature of a facility such as a green house after installing the light shielding net in the facility.

Further, it is possible to selectively apply an amount of light to be blocked by the light shielding net.

In more detail, most conventional shading nets are typically manufactured by combining or complexly weaving film-type weft yarns using monofilaments. However, the weaving method is complicated to cause deterioration in productivity and the strength is also reduced, hence causing frequent occurrence of damages to the product by external impact.

As a result, the light shading net has a short lifespan and, when applied to a facility such as a green house, it is difficult to apply a winding process for removal or installation of the light shading net depending on external environments.

To overcome the above problem, a warp yarn made of PE monofilament and a weft yarn in the form of PE film may be woven in a Leno weave form so as to prevent damage even if a force due to external factors is applied in a longitudinal direction, that is, the warp yarn direction or a transverse direction, that is, the weft yarn direction.

Therefore, even when a large-scale light shielding net is wound on the winding device, it is possible to prevent the warp yarn- or weft yarn-woven structure from being destroyed.

With regard to the light shielding net of the present invention, a binding ability between PE films as the weft yarns and the warp yarns may be increased by positioning a weft yarn between two warp yarns during weaving and then crossing a pair of warp yarns and weaving the same, or twisting each warp yarn once or twice after crossing the same (see FIGS. 3 and 4).

Further, a width of the PE film applied to the weft yarn may be maintained in a size of 2 to 5 mm.

This is for the purpose of adjusting a density of the weft yarns to control an amount of light transmitted through the PE film after weaving, and adjusting a load per unit area of the light shielding net and a breaking strength in a longitudinal direction of the weft yarn.

In more detail, the number of weft yarns included per unit area (in×in) may be differently applied by folding the PE film, which maintains the same width as described above, in a width direction to form two or three layers.

Accordingly, the weaving density of the weft yarns may be applied with 7 to 15/in, while the weaving density of the warp yarns may be applied with 2 to 5/in.

At this time, the warp yarn may be prepared of PE monofilament mixed with a UV blocking agent so as to increase light fastness.

Further, one or two sheets of PE films may be applied to the weft yarn. Specifically, in order to adjust the winding strength and the light shielding amount, one sheet of PE film may be folded in two or three layers in the width direction, otherwise, two sheets of PE films may be stacked and then folded in four or six layers, followed by weaving the same (see FIG. 5).

In more detail, the PE film applied to the weft yarn may be folded to adjust a thickness thereof so that an amount of sunlight transmitted through the PE film can be controlled. Further, even when sunlight is transmitted, it is possible to prevent the light from becoming a direct light form due to passing through a single PE film, instead, the light may pass through the folded PE film at a predetermined thickness thus being deflected or dispersed.

In the growth of plants, the above configuration is for the purpose of ensuring better growth of the plants by allowing light to be evenly radiated to the plants in a facility since the light does not the direct light but is spectrally formed.

Further, the above-described weft yarn may be prepared of the PE film containing a pigment that expresses various colors depending on the place where the light shielding net is installed or on conditions for cultivation of plants requiring light shielding.

This is because the existing shading net is typically woven using a black film with a high light absorption rate and thus involves a problem that it was difficult to reflect various requirements for an installation site.

For example, when focusing on aesthetics of design of the place where the light shielding net is installed, there was a problem that the conventional shading net applied with black color has a difficulty in installation. Further, in the case of plant cultivation in which the optimal amount of light must be afforded by adjusting the light amount to be shaded, there was inconvenience of adjusting a time to be shaded or supplementing the light by providing additional lighting.

According to the present invention, it is possible to express various colors and to implement different light shielding amounts. Further, it is possible to weave a light shielding net that can express various colors by arranging one weft yarn on the same line during weaving or has a different color in a part of the light shielding net.

Hereinafter, in order to measure a tensile strength of a stretched yarn to thus compare a strength of the light shielding net according to an embodiment of the present invention with the existing light shading net, the measurement was performed in compliance with "KS K 0520:2015 Grab method (CRE Type)".

Comparative Example 1

The existing light shading net of this comparative example is typically woven as follows and sold in the market: one end of a film yarn is combined with a mono yarn and sent to the rear of the previously formed loop to form a loop; the mono yarn and the film yarn are separated; the mono yarn is combined with the supplied other film yarn to form another loop after the previously formed loop; subsequently, the film yarn moves to the next course and is combined with another mono yarn to form another loop; thereafter, the film yarn moved to the course is moved again to a position where the loop was formed, and then is combined with the mono yarn to form a loop.

Comparative Example 2

The existing light shading net of this comparative example is typically woven as follows and sold in the market: in regard to weaving a large number of film yarns by forming knots with mono yarns, one film yarn is hooked and tied between one mono yarn and the next mono yarn so that two adjacent film yarns are crossed and woven by four mono yarns while overlapping the two film yarns each other half by half.

Example

Weft yarn: 1 sheet of 4 mm PE film, folded in 3 layers
Warp yarn: PE monofilament After placing one weft yarn between a pair of warp yarns, the pair of warp yarns is crossed and woven in a Leno weave form.

TABLE

| Test item | Test result | | |
|---|---|---|---|
| | Sample 1 | Sample 2 | Sample 3 |
| Tensile strength (N): KS K 0520: 2015 Grab method (CRE Type) | | | |
| Warp direction | 100 | 88 | 180 |
| Weft direction | 100 | 140 | 360 |

Note)
1 - Grab distance (75 ± 1) mm
2 - Test speed: 50 mm/min

As described above, with regard to the light shading net woven in Comparative Example 1 as sample 1, the light shading net woven in Comparative Example 2 as sample 2, and the light shielding net woven in Example of the present invention as sample 3, the test was implemented to measure a tensile strength of fabric of each of the samples 1 to 3. From the test results, in terms of the tensile strengths in both of the warp direction and the weft direction, it could be confirmed that sample 3 according to the present invention is significantly superior rather than sample 1 and sample 2 which are the existing light shading nets.

Accordingly, when installing a light shielding net in a large-scale facility or removing the same, the light shielding net can be wound using a winding device. Further, when the light shielding net is bound to a facility such as a green house in order to prevent the same from being released, it is possible to bind the light shielding net more strongly, thereby overcoming the conventional problem of decreased tensile strength.

DESCRIPTION OF REFERENCE NUMERALS

1: Warp yarn
2: Weft yarn

The invention claimed is:

1. A light shielding net manufactured by weaving warp yarns made of PE monofilaments and weft yarns made of PE films, wherein:
   the weft yarn is formed by:
      folding a single sheet of PE film in two or three layers in a width direction, or
      stacking two sheets of PE films and folding the same in four or six layers in the width direction, so as to adjust a winding strength and/or a light shielding amount and to disperse the light transmitted through the net, and
   the light shielding net is completed by repeatedly weaving the warp yarns and the weft yarns in a Leno weave form such that two warp yarns surround each weft yarn.

2. The light shielding net according to claim 1, wherein:
   the two warp yarns are crossed and woven while surrounding the weft yarn, or
   each warp yarn is twisted once or twice after crossing the same.

3. The light shielding net according to claim 1, wherein:
   the PE film applied to the weft yarn has a width of 2 to 5 mm, and
   the PE monofilament applied to the warp yarn is made of a PE material mixed with a UV blocking agent.

4. The light shielding net according to claim 1, wherein:
   a weaving density of the weft yarns ranges from 7 to 15/in, and
   a weaving density of the warp yarns ranges from 2 to 5/in.

5. The light shielding net according to claim 4, wherein the weft yarn is prepared using a PE film containing a pigment to express color.

6. The light shielding net according to claim 1, wherein the weft yarn is prepared using a PE film containing a pigment to express color.

7. The light shielding net according to claim 2, wherein the weft yarn is prepared using a PE film containing a pigment to express color.

8. The light shielding net according to claim 3, wherein the weft yarn is prepared using a PE film containing a pigment to express color.

* * * * *